INVENTORS
HERBERT ARTHUR CLEMENTS
HAROLD SINCLAIR
BY
Benjamin Sweedler
ATTORNEY

June 20, 1967 H. A. CLEMENTS ETAL 3,326,056

POWER TRANSMISSION MECHANISMS

Filed Feb. 11, 1964 5 Sheets-Sheet 2

INVENTORS
HERBERT ARTHUR CLEMENTS
HAROLD SINCLAIR

BY

Benjamin Sweedler
ATTORNEY

POWER TRANSMISSION MECHANISMS
Filed Feb. 11, 1964
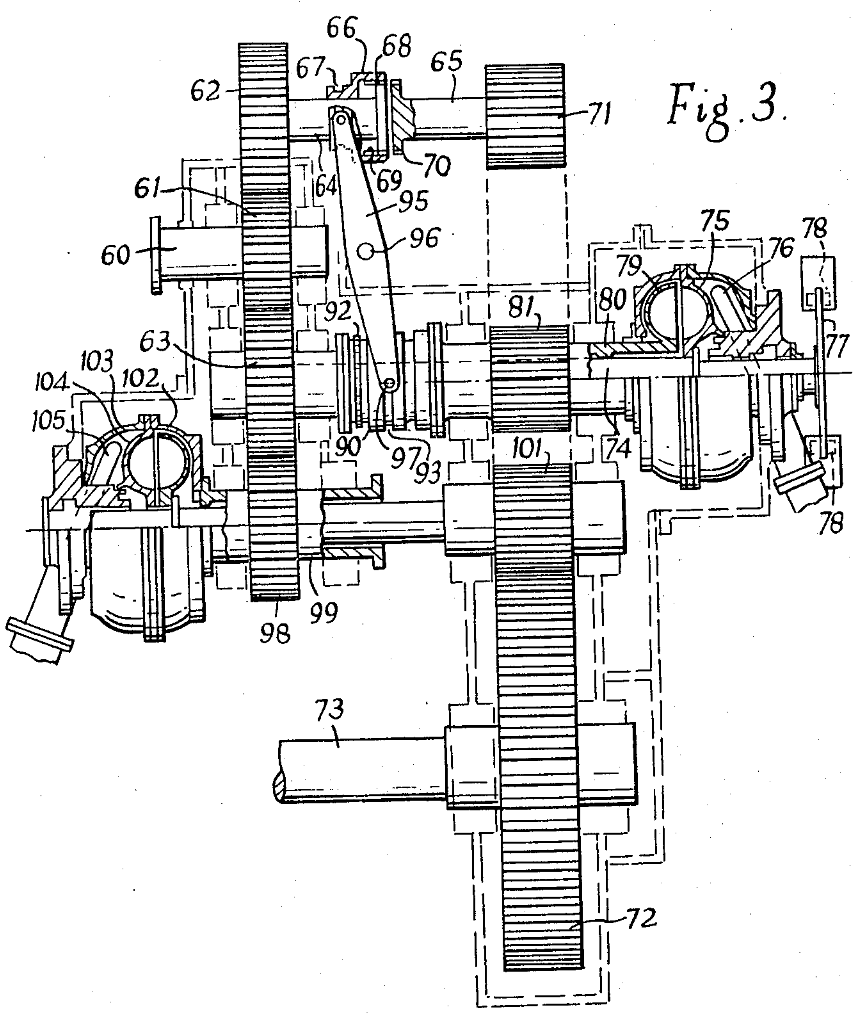
INVENTORS
HERBERT ARTHUR CLEMENTS
HAROLD SINCLAIR
BY
Benjamin Sweedler
ATTORNEY POWER TRANSMISSION MECHANISMS
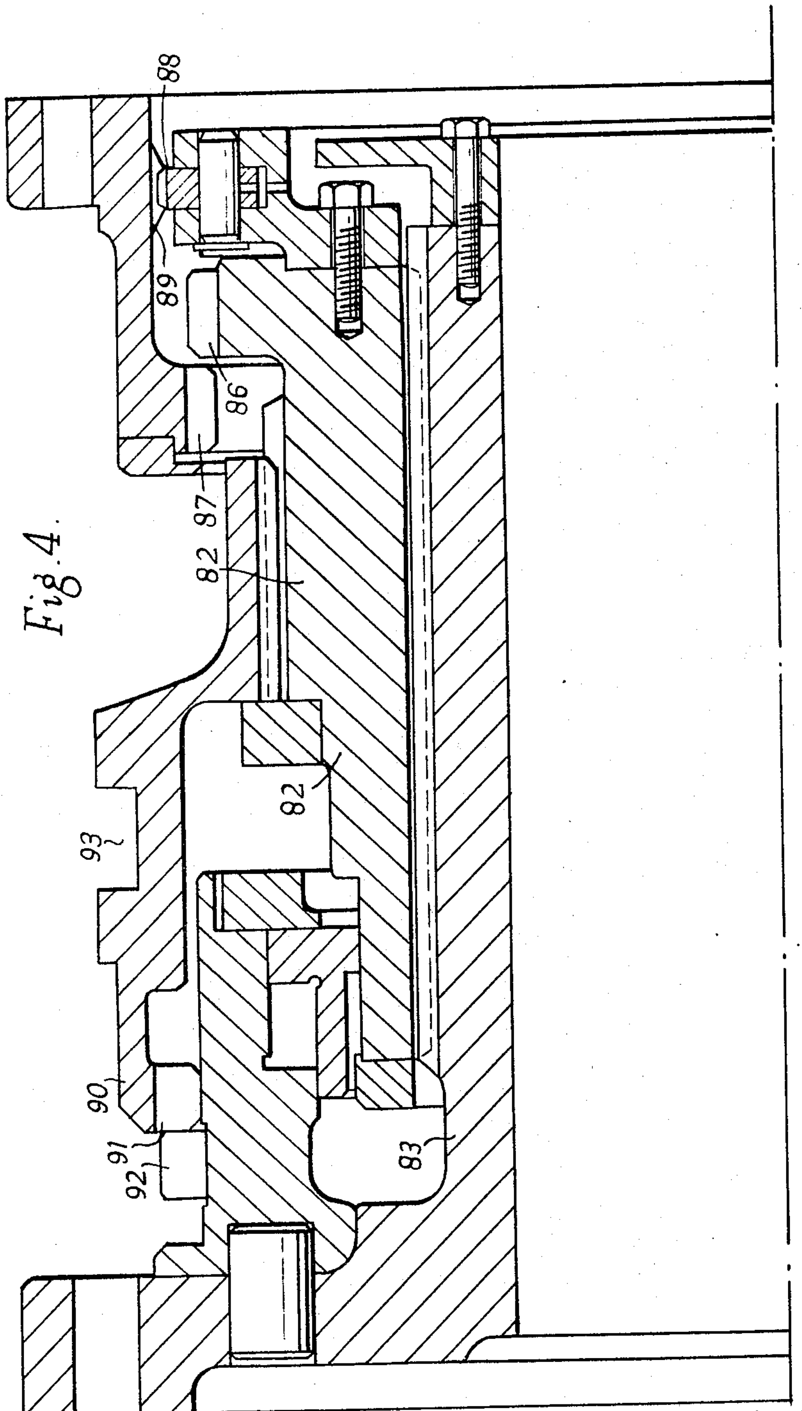
INVENTORS
HERBERT ARTHUR CLEMENTS
HAROLD SINCLAIR
BY
Benjamin Sweedler
ATTORNEY POWER TRANSMISSION MECHANISMS
Filed Feb. 11, 1964 5 Sheets-Sheet 5
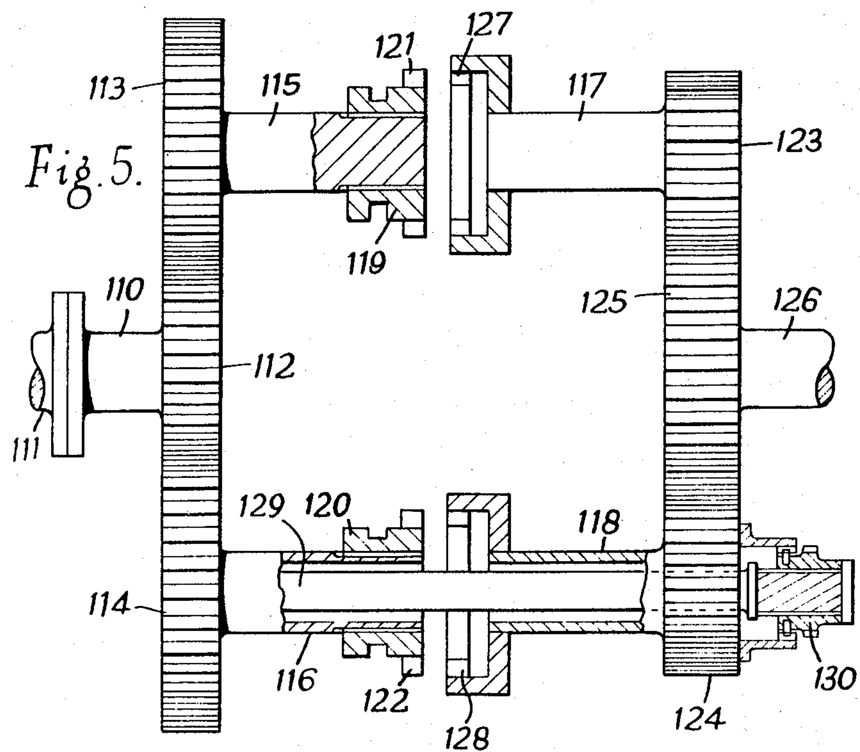
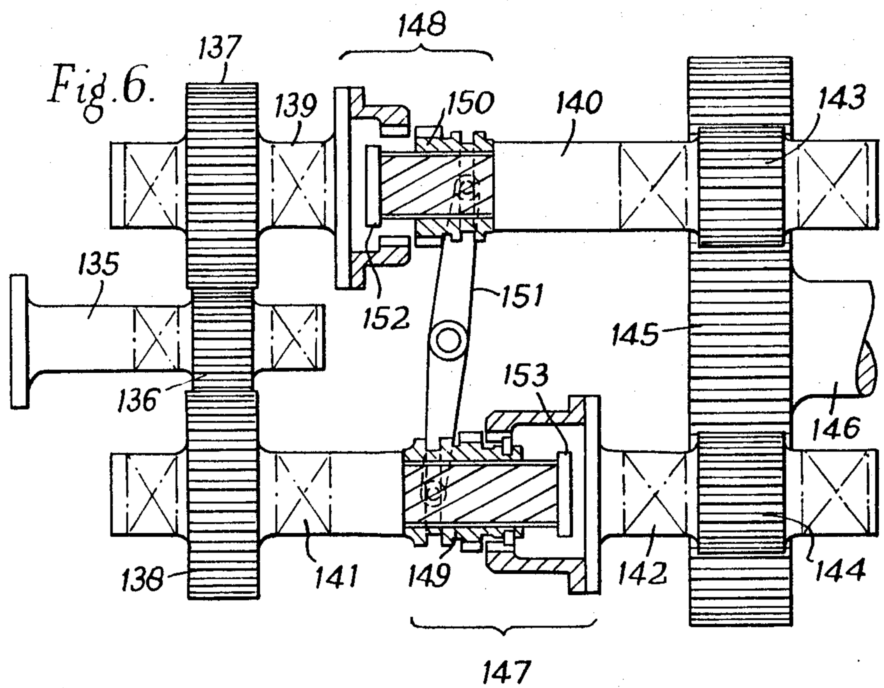

United States Patent Office 3,326,056

Patented June 20, 1967

3,326,056

POWER TRANSMISSION MECHANISMS

Herbert Arthur Clements, Surrey, and Harold Sinclair, London, England, assignors to S.S.S. Patents Limited, Surrey, England, a British company Filed Feb. 11, 1964, Ser. No. 344,149

Claims priority, application Great Britain, Feb. 13, 1963, 5,898/63; Oct. 15, 1963, 40,711/63

9 Claims. (Cl. 74—339)

This invention relates to power transmission mechanisms, particularly but not exclusively for the transmission of high torque and/or high power, wherein positive toothed type controllable clutches are used for engaging and disengaging the drive. The object of the invention is to provide means for precisely lining up viz. phasing the inter-engageable teeth of a toothed clutch relative to each other in the correct angular relationship for inter-engagement when in rotation.

Power transmission mechanism in accordance with the invention comprises a toothed main clutch and in parallel therewith a subsidiary synchronous self-shifting clutch which may have pawl and ratchet mechanism to effect its engagement when passing through synchronism, the inter-engageable parts of said main clutch being operatively connected to the inter-engageable parts of said subsidiary clutch in such a construction that with the subsidiary clutch engaged the said parts of the main clutch are correctly phased for inter-engagement.

Figure 1:
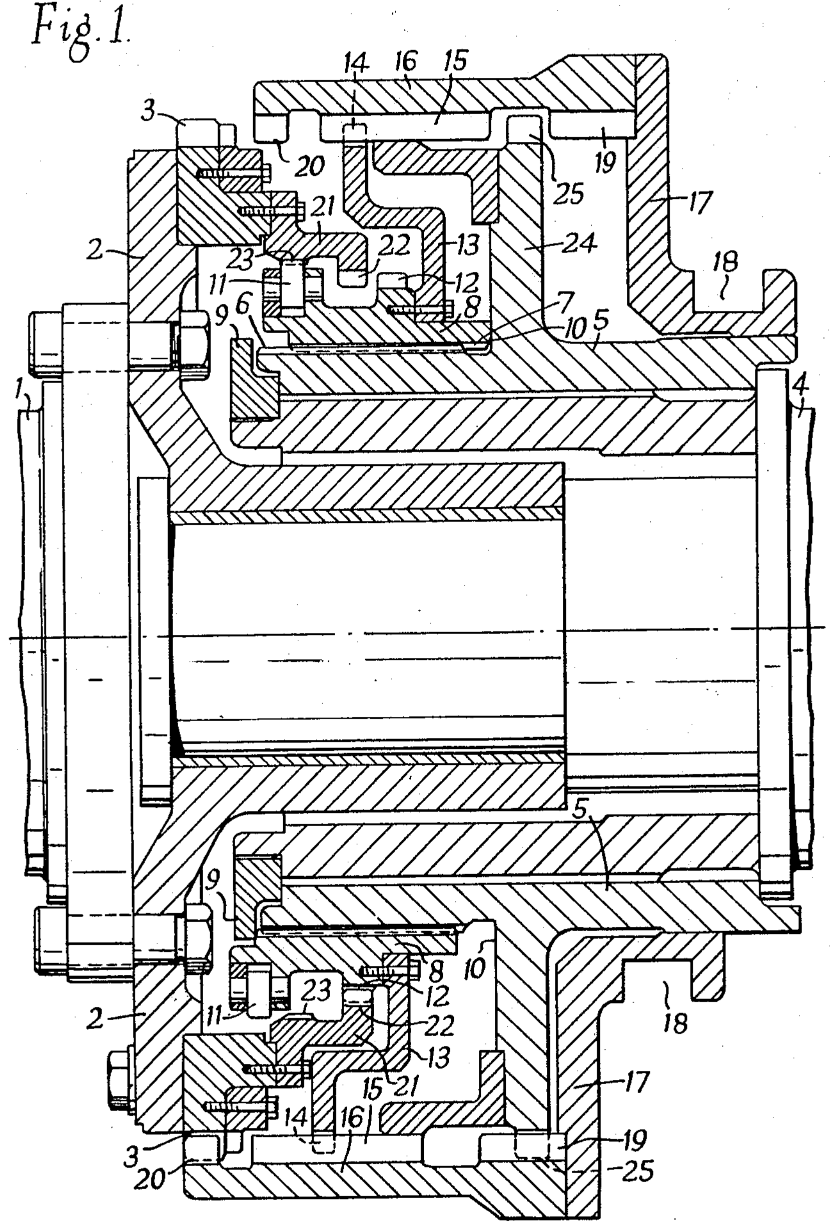
Figure 2:
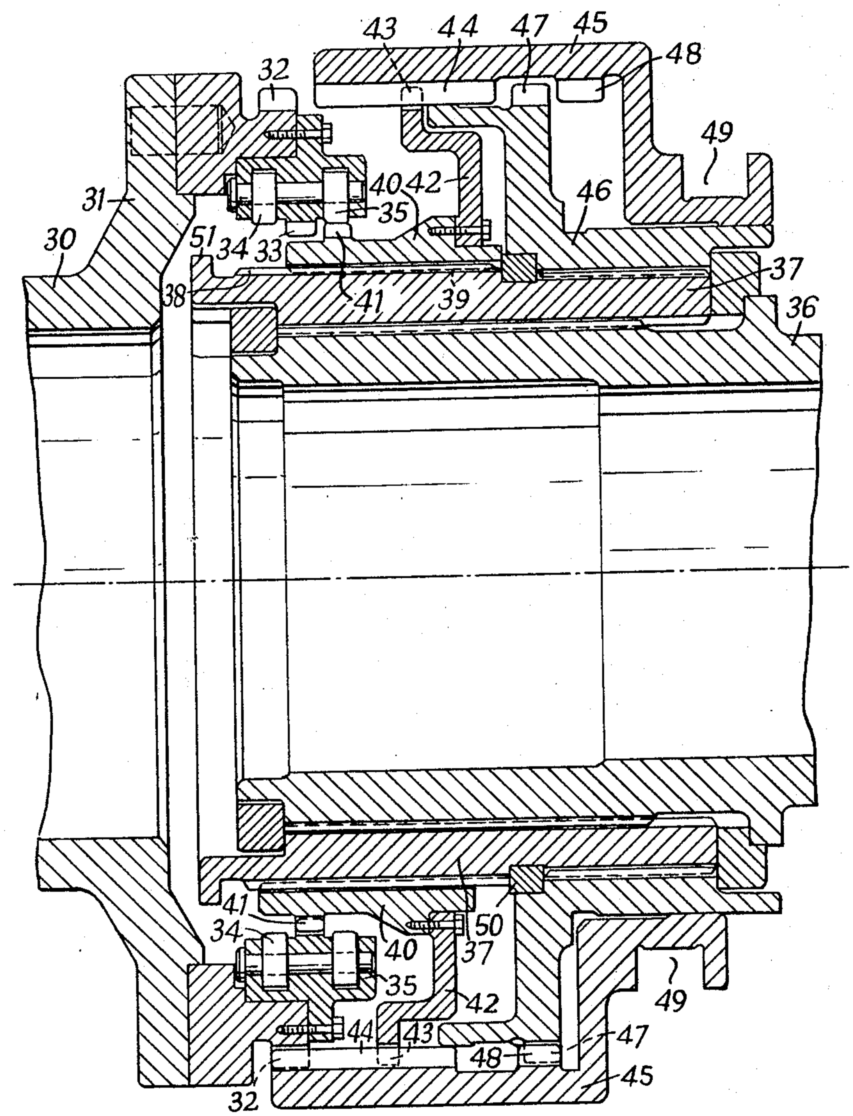

In the accompanying drawings:

FIG. 1 illustrates an embodiment of the invention for incorporation in a shaft system normally rotating in one direction, wherein the subsidiary synchronising clutch is incorporated within the main clutch, the upper half of the figure showing the main and subsidiary clutches disengaged, and the lower half showing them engaged, FIG. 2 illustrates an embodiment similar to FIG. 1 suitable for use in the application to of a slow speed turbine barring gear drive to a high speed turbine shaft that normally rotates in one direction but is required at times to rotate in the opposite direction, the upper half of the figure showing the main and subsidiary clutches disengaged, and the lower half showing them engaged, FIG. 3 illustrates an embodiment of the invention as applied to a locked train gear system wherein the subsidiary synchronising clutch serves to phase correctly for engagement the clutch parts of two main clutches arranged on parallel shafts of the gear system, FIG. 4 is a view in longitudinal half-section, on a larger scale than FIG. 3, of the subsidiary clutch incorporated in the embodiment shown in FIG. 3, FIG. 5 is a diagrammatic illustration of a further embodiment of the invention as applied to a locked train gear system, and FIG. 6 is a diagrammatic illustration of a further embodiment of the invention as applied to a locked train gear system.

In FIG. 1 the input shaft 1 is bolted to a radially outwardly projecting flange 2 carrying a ring of external main clutch teeth 3, and the output shaft 4 carries a sleeve 5 formed with external helical splines 6 with which engage internal helical splines 7 in an intermediate member 8 capable of limited helical movement relative to the sleeve 5 between stops 9 and 10. The intermediate member 8 is provided with a ring of pawls 11 and external subsidiary clutch teeth 12, and has bolted to it a radially outwardly projecting annular flange 13 formed with a ring of external auxiliary teeth 14 continuously engaged with a ring of internal straight splines 15 in a main clutch sleeve 16 which is bolted to an actuating member 17 slidable axially on the sleeve 5 under the action of a control fork (not shown) that engages a groove 18. The main clutch sleeve 16 is formed with a ring of internal main clutch teeth 19 and a ring of internal clutch teeth 20 spaced axially each side of the splines 15. Bolted to the main clutch ring 3 is a subsidiary clutch element 21 having a ring of internal subsidiary clutch teeth 22 and a ring of internal ratchet teeth 23. The sleeve 5 is formed with a radially outwardly projecting annular flange 24 formed with a ring of external main clutch teeth 25.

Assuming that the main clutch teeth 3, 20 and 19, 25 and the subsidiary clutch teeth 12, 22 are disengaged, as shown, and that the input shaft 1 is over-running the output shaft 4, the pawls 11 ratchet relative to the ratchet teeth 23. If an attempt is made to engage the main clutch sleeve 16 by operating the above-mentioned fork to shift the sleeve 16, to the left from the position shown, the left-hand ends of the rotating internal main clutch teeth 19 will be baulked by the ends of the rotating external main clutch teeth 25 which are rotating at the same speed; hence the clutch cannot be engaged.

When the main clutch is to be engaged, the input shaft 1 is retarded, or the output shaft 4 is accelerated, until the output shaft 4 tends to over-run the input shaft 1, and on passing through the condition of synchronism of the two shafts pawls 11 engage ratchet teeth 23 and the intermediate member 8 is shifted helically to the left relative to the sleeve 5 to engage the subsidiary clutch teeth 12 with the subsidiary clutch teeth 22. During the helical movement of the intermediate member 8 the auxiliary teeth 14 slide axially relative to the splines 15, and at the same time turn the main clutch sleeve 16 relative to the sleeve 5, until, when the intermediate member 8 is in full toothed engagement, the internal clutch teeth 19 and 20 are phased for engagement respectively with the clutch teeth 25 and 3, whereupon the main clutch sleeve 16 can be shifted axially to the left by the control fork into toothed engagement. The transmission of torque from the input shaft 1 to the output shaft 4 takes place via the main clutch sleeve 16, and the subsidiary synchronous clutch teeth 22, 23 are relieved from load.

In FIG. 2, the steam turbine shaft 30 normally rotates in one direction for ahead propulsion, but is required to rotate in the opposite direction for astern drive. The shaft 30 is formed with a flange 31 carrying a clutch ring with teeth 32, to which is bolted a subsidiary clutch ring with teeth 33, and two axially spaced rings of pawls 34 and 35, the noses of which point in opposite directions. The hollow shaft 36 which is rotatable at low speed by a geared barring motor which can be switched to operate in either direction of rotation has keyed thereto a sleeve 37 formed with external helical splines 38 with which engage internal helical splines 39 in an intermediate member 40 formed with a ring of external subsidiary clutch teeth 41. The intermediate member 40 has bolted to it a radially outwardly projecting annular flange 42 formed with a ring of external teeth 43 continuously engaged with elongated clutch teeth 44 in a main clutch sleeve 45 slidable on a sleeve 46 which is splined and clamped endwise to the sleeve 37 and carries external main clutch teeth 47. The clutch sleeve 45 carries internal clutch teeth 48, and is formed with a groove 49 for engagement by a control fork (not shown) that can be actuated by resilient control means.

With the barring motor stationary and the turbine rotating, the intermediate member 40 takes up one end position or the other against stops 50 or 51 according to the direction of rotation of the turbine shaft 30, since the noses of the pawls 34 and 35 point in opposite directions so that if with the intermediate member 40 in one end position a pawl in one set of pawls engages a subsidiary clutch tooth 41, the intermediate member 40 is drawn into its other end position, firstly by the interaction of the engaged pawl and the tooth 41 and then by the interaction of the teeth 33 and 41. In the said other end position the other set of pawls ratchets relative to the teeth 41, preferably disengaging from them centrifugally above a predetermined angular speed of the turbine shaft.

If under these conditions the barring motor is switched on to rotate the shaft 36 in the same direction as the turbine shaft 30, and an attempt is made to engage the barring gear clutch, by shifting the main clutch sleeve 45 e.g. to the left from the position shown, the teeth 48 on the slowly rotating clutch sleeve 45 will abut the teeth 47 on the part 46 rotating at the same speed and prevent clutch engagement; thus obviating nuzzling contact between the clutch teeth 43 and the clutch teeth 32, rotating at turbine shaft speed.

When the turbine is retarded, and the speed of shaft 30 falls below a predetermined angular speed, the pawls ratchetting on the clutch teeth 41 e.g. the pawls 35, engage the teeth 41 when passing through synchronism, whereupon the intermediate member 40 is shifted e.g. to the left relative to the sleeve 37. When the intermediate member 40 reaches the position of full toothed engagement, as shown in the lower half of FIG. 2, the clutch teeth 44 and 48 are correctly phased for inter-engagement with the clutch teeth 32 and 47 respectively, and the sleeve 45 moves to the left under the action of the control means, thus engaging the barring gear clutch and at the same time preventing further helical movement of the intermediate member 40, as in the lower half of FIG. 2.

The declutching operation is effected prior to accelerating the turbine shaft 30 by energising the control means to urge the clutch sleeve 45 to the right, whereafter the torque transmitted through the clutch teeth 32, 34 and 47, 48 is relieved immediately the turbine shaft 30 commences to over-run the barring gear shaft and the barring gear clutch disengages, the parts returning to the positions shown in the upper half of FIG. 2. The barring motor is then switched off.

If the clutch is required to be engaged with the turbine shaft 30 rotating in the direction for astern drive the barring gear motor is switched on to rotate the shaft 36 in the corresponding direction, and the foregoing sequence of operations is repeated to engage the clutch teeth 32, 44 and clutch teeth 47, 48 at the moment when passing through synchronism between the speeds of the turbine shaft 30 and of the barring gear shaft 36.

Referring to FIGS. 3 and 4, the input shaft 60 constitutes the input shaft of the locked train gearing shown in a developed view. The shaft 60 carries a first reduction pinion 61 in mesh with two similar first reduction gear wheels 62 and 63. The gear wheel 62 is mounted on a first part 64 of a two-part layshaft 64, 65 a clutch ring 66 with an actuating groove 67 and a ring of straight internal clutch teeth 68 in engagement with external clutch teeth 69 carried by the part 64, being axially slidable on the part 64. The second part 65 of the layshaft carries a ring of straight external clutch teeth 70 and a second reduction pinion 71 in mesh (as indicated by the dotted lines) with a second reduction gear wheel 72 mounted on an output shaft 73.

The gear wheel 63 is mounted on one end of a continuous layshaft 74 on the other end of which is mounted the impeller 75 of an ahead hydraulic turbo coupling of a type in which the working circuit can be selectively filled or emptied, in the case illustrated, by means of a pump (not shown) with the degree of filling controlled by an adjustable scoop tube, 76. A disc brake 77, 78 is mounted on the end of the layshaft 74 and can be applied when required to retard the input shaft system relative to the output shaft system. The runner 79 of the ahead turbo coupling is mounted on a sleeve shaft 80 surrounding the continuous layshaft 74 and carrying a second reduction pinion 81 meshing with the gear wheel

72. A synchronous self-shifting clutch is provided for clutching the sleeve shaft 80 to and unclutching it from the layshaft 74. The said clutch (see (FIG. 4) comprises an intermediate member 82 mounted for helical movement relative to a sleeve 83 drivably connected to the gear wheel 63 and the layshaft 74, the intermediate member being movable between end stops 84 and 85 and carrying a ring of external clutch teeth 86 engageable with and disengageable from a ring of internal clutch teeth 87 drivably connected to the sleeve shaft 80. The intermediate member 82 also carries a ring of pawls 88 (see FIG. 4) adapted to ratchet relative to internal ratchet teeth 89 adjacent the internal clutch teeth 87 or to engage with them to actuate the intermediate member 82 according to the direction of relative rotation of the sleeve shaft 80 and the layshaft 74. A control sleeve 90 splined to the intermediate member 82 for axial movement relative thereto carries internal locking dogs 91 that can engage with external locking dogs 92 fast with the sleeve 83 when the clutch is engaged but are baulked axially by the external locking dogs 92 when the clutch is disengaged. The control sleeve 90 is formed with an external groove 93 in which engages a control fork 94 on one arm of a lever 95 pivoted at 96, the other arm of which carries a control fork 97 engaged in the groove 67 in the clutch ring 66.

The gear wheel 63 is also in mesh with a reversing gear wheel 98 mounted on a sleeve shaft 99 surrounding a reversing shaft 100 on which is mounted a reversing pinion 101 in mesh with the gear wheel 72 on the output shaft, the reversing shaft 100 also carrying the runner 102 of an astern hydraulic turbo coupling; the casing 103 and impeller 104 of which are carried by the sleeve shaft 99. This astern hydraulic turbo coupling is also of a type which can be selectively filled and emptied, being controlled in the case illustrated by means of an adjustable scoop tube 105.

The synchronous self-shifting clutch between the layshaft 74 and the sleeve 80 is inverted, i.e. it tends to disengage under the action of driving torque applied to the input shaft 60, viz, when the layshaft 74 tends to overrun the sleeve shaft 80, and to engage when the sleeve shaft 74 tends to over-run the layshaft 80 in the normal driving direction.

The clutch associated with the two-part layshaft 64, 65 has the same number of clutch teeth as the synchronous self-shifting clutch associated with the layshaft 74, which rotates at the same speed as the two-part layshaft 64, 65.

In the event that the two layshafts 64, 65 and 74 are geared to rotate at different speeds, for a given speed of the input shaft 60, it is necessary that the number of teeth in one clutch multiplied by the angular speed of its associated layshaft shall be the same as the number of teeth in the other clutch multiplied by the angular speed of its layshaft, and so on if further layshafts are incorporated in additional power paths in the gearing.

The operation is as follows:

Initially, when the system is in a neutral gear condition the working circuit of both hydraulic turbo couplings are filled and the clutches 69, 70 and 82–92 are both disengaged. When the prime mover, e.g. a gas turbine coupled to the input shaft 60, is started up and set to idling speed, torque will be transmitted to the output shaft 73 via the pinion 81 on the sleeve shaft 80 and the associated turbo coupling 75, 79, and also via the turbo coupling 102, 104, and since the torque transmitted via the two turbo couplings is substantially equal and in opposite senses the output shaft 73 will not rotate.

Under manoeuvering conditions for ahead, stop, or astern drive, the power output of the gas turbine will be limited to say 50% of the maximum power capacity.

For ahead manoeuvering, the working circuit of the astern turbo coupling 102, 104 is emptied so that low speed ahead drive to the output shaft 73 is obtained via the ahead turbo coupling 75, 79 and the pinion 81 to drive the output shaft 73 in the ahead direction.

For astern manoeuvering the working circuit of the ahead turbo coupling 75, 79 is emptied and the working circuit of the astern turbo coupling 102, 104 is filled to drive the output shaft 75 in the astern direction.

During manoeuvering the synchronous self-shifting clutch will remain disengaged for the reasons that during ahead manoeuvering the sleeve shaft 80 rotates at a lower speed than the layshaft 74 due to the slip in the ahead turbo coupling 75, 79, and during astern manoeuvering the pinion 81 is rotated backwards due to the astern rotation of the gear wheel 72. During manoeuvering the clutch 69, 70 will also be disengaged, because of the interconnection through the pivoted lever 95.

For setting the system for direct drive ahead via the locked train gearing, viz. via both layshafts 64, 65 and 74, so as to use the maximum power of the turbine and to eliminate the slip in the ahead turbo coupling, the system is first set for ahead propulsion i.e. with the ahead turbo coupling 75, 79 filled and the astern turbo coupling 102, 104 emptied, and the control sleeve 90 of the synchronous self-shifting, clutch is urged by resilient control means (not shown) acting through the pivoted lever 95 in the direction to engage its locking dogs 91 with the shaft dogs 92. The locking dogs 91 are however baulked axially for the time being by end contact with the shaft dogs 92. The output of the gas turbine is then momentarily reduced, and the brake 77, 78 is applied to reduce the angular speed of the layshaft 74 to that of the sleeve shaft 80, whereupon pawls 88 of the synchronous-self-shifting clutch will engage ratchet teeth 89, thereby shifting the intermediate member 82 helically to bring its clutch teeth 86 into precise engagement with the teeth 87. The accompanying angular movement of the control sleeve 90 relative to the layshaft 74 brings its locking dogs 91 into register with the gaps between the shaft dogs 92, and the control sleeve 90 moves axially under the action of the said resilient control means so as to engage its locking dogs 91 with the shaft dogs 92 and thereby lock the synchronous clutch in the engaged condition, to provide a direct driving connection between the layshaft 74 and the sleeve shaft 80. At the instant when the clutch teeth 86 are fully inter-engaged with the clutch teeth 87 the internal clutch teeth 68 of the clutch associated with the two-part layshaft are precisely phased for inter-engagement with the external clutch teeth 70. Hence when the control sleeve 90 moves axially to lock the synchronous clutch the lever 95 is turned through a sufficient angle for the control fork 98 engaged with the clutch ring 66 to be shifted axially to engage the clutch teeth 68 and 70 and drivably couple the two parts 64, 65 of the layshaft together. The brake 77, 78 is then released, automatically by control valve means (not shown). There are now two parallel power paths established between the input shaft 60 and the output shaft 73, and these power paths including the associated gearing share the transmitted power substantially equally when the power of the gas turbine is increased and driving torque is applied to the input shaft 60 in the ahead direction.

For a change from full speed ahead drive to ahead manoeuvering, the gas turbine control is moved to idling position with the ahead turbo coupling filled, the said resilient control means are operated in the sense to disengage the control sleeve 90, and the brake 77, 78 is applied long enough to relieve the control sleeve 90 from driving torque. The control sleeve 90 moves to the unlocking position under the action of the resilient control means, and the lever 95 turns on its pivot to disengage the clutch 69, 70, whereupon the full power of the gas turbine is reestablished, the intermediate member 21 of the synchronous self-shifting clutch moving automatically to its disengaged position, and the drive from the gas turbine to the output shaft 73 is now via the ahead hydraulic turbo coupling.

Means may be provided whereby the movement of the control sleeve 90 to the unlocked position effects automatic disengagement of the brake 77, 78, which may be a disc type brake as shown, operated by fluid pressure and adequate in size to dissipate the energy input during its brief period of appplication.

Referring to FIG. 5, an input shaft 110 coupled to the output shaft 111 of a gas turbine carries a first reduction pinion 112 meshing with two similar first reduction gear wheels 113 and 114 mounted respectively on first parts 115 and 116 of two-part layshafts 115, 117 and 116, 118 on which are axially slidable clutch rings 119 and 120 formed with straight external clutch teeth 121 and 122. Two second reduction pinions 123 and 124 meshing with a gear wheel 125 on an output shaft 126 are mounted on the second parts 117 and 118 of the layshafts, which carry internal clutch teeth 127 and 128. The two clutches constitute means for drivably connecting the gear wheels 113 and 114 to the respective pinions 123 and 124. The layshaft 116, 118 is a hollow shaft and through it extends a quill shaft 129 connected at one end to the gear wheel 114, the other end projecting beyond the pinion 124. A subsidiary synchronous clutch 130, which is shown diagrammatically and is similar to the synchronous clutch of FIG. 1 except that it does not have a control sleeve, is provided between the projecting end of the quill shaft 129 and the end of the pinion 124. This synchronous clutch 130 is of the inverted type described above, arranged so that it is disengaged when driving torque is being transmitted from the input shaft 10 to the output shaft 126 and engages automatically when the speed of the input shaft 110 is reduced and the pinion 124 would tend to over-run the quill shaft 129. The synchronous clutch and the clutches in the two layshafts all have the same number of clutch teeth.

The clutches in the layshaft may be inter-connected mechanically for conjoint operation in the same sense by a fluid pressure operated servo motor, but are preferably arranged to be actuated together by independent servo motors, under the control of a valve actuated by the axial movement into the engaged position of the intermediate member of the clutch 130.

The locked train gear and clutch system in FIG. 5 constitutes an alternative arrangement to the locked train gear system in FIG. 3, and is is associated with ahead and astern hydraulic turbo couplings and a reversing layshaft, also a disc brake, as described with reference to FIG. 3.

With the output shaft system at rest and the gas turbine at idling power, the ahead and astern turbo couplings are filled and all the clutches are disengaged. Under these conditions the pawls of the synchronous clutch are in ratchetting relationship with the coacting ratchet teeth, and the driving and driven elements of the straight toothed clutches in the layshafts are in relative rotation.

When it is desired to transmit power ahead the astern coupling is emptied, and the gas turbine power is suitably increased so as to drive the output shaft system through the ahead gear train. When it is desired to engage the direct drive locked train gearing for high power ahead propulsion the turbine power is first reduced to idling and the disc brake is applied to retard the input shaft system, so that the reversal of relative rotation due to the inertia and continued rotation of the output shaft system causes the synchronous clutch 130 to engage, whereupon the toothed clutches in the two layshafts will be in precisely phased relationship for interengagement of the clutch teeth by operation of servo motor mechanism (not shown) under the control of valve means actuated by the engagement of the synchronous clutch 130. When the clutches in the layshaft clutches are in engagement the disc brake is released and the power of the gas turbine can be increased to maximum output, driving through the locked gear train with substantially equal loads in the two parallel shaft systems.

In this embodiment the synchronous clutch 130 only requires to be large enough to transmit the negative torque arising in the shaft system with the clutch engaged following the requisite application of the disc brake with the gas turbine at idling power, and the output shaft 126 kept in rotation by the inertia of the output shaft system.

In a modification of the above-described system the synchronising clutch is provided between a pinion meshing with the gear wheel 125 and a subsidiary shaft connected for rotation with the pinion 112.

In FIG. 6 an input shaft 135 carries a first reduction pinion 136 meshing with first reduction gear wheels 137 and 138 on two part layshafts 139, 140 and 141, 142 and second reduction pinions 143, 144 on the layshafts mesh with a gear wheel 145 on an output shaft 146. A synchronous self-shifting clutch 147 with conventional pawl and ratchet mechanism is provided between the parts of the layshaft 141, 142, this clutch being adapted to engage when subject to positive or driving torque and to disengage (if unlocked) under negative or reverse torque.

A similar synchronous clutch 148 is arranged between the parts 139, 140 of the other layshaft, but this clutch has no pawl and ratchet mechanism. The helically movable intermediate members 149 and 150 of the two clutches are interconnected for conjoint motion by a mechanical linkage, viz. a pivoted lever 151 so that they engage and disengage together.

In this embodiment of the invention the normal propulsion is by a diesel engine preferably connected through a hydraulic turbo coupling to the same gear and output shaft system to give economical cruising power with the gas turbine coupled to shaft 135 shut down. The gas turbine constitutes an additional source of power when required. Hence when in operation with ahead diesel propulsion the gas turbine is started up the application of forward driving torque to the input shaft 135 causes the pawls of the clutch in the layshaft 141, 142 to engage coacting ratchet teeth so that the intermediate member 149 of this clutch is drawn helically towards toothed engagement. The arrangement of the two clutches and of the mechanical linkage connecting them is such that when the intermediate member 149 of the clutch 147 provided with pawl and ratchet mechanism has moved axially into an initially inter-engaged condition of its clutch teeth the intermediate member 150 of the other clutch is aligned for precise inter-engagement of its coacting teeth. As the intermediate member 149 of the pawl-actuated clutch moves axially towards full toothed engagement due to the interaction of the clutch teeth, the intermediate member 150 of the other clutch similarly moves into the fully engaged position due to the interaction of its clutch teeth. The end positions of the two intermediate members when fully engaged are determined by stops 153 and 152. The gearing is then in a condition for the transmission of the full power of the turbine, shared substantially equally between the two power paths of the gearing. When the input shaft 135 is retarded, as by the power of the gas turbine being reduced, both clutches disengage automatically under the action of the reversal of torque through them. If desired a control lock may be applied to one or both of the clutches whereby to retain both clutches in the engaged positions under negative torque conditions. In this case the control lock would preferably be interlocked with the gas turbine power control whereby to ensure that the control lock for the clutches is moved to the free position before shutting down the gas turbine, prior to operation ahead or manoeuvring with diesel engine power, after engaging the hydraulic turbo coupling to connect the diesel engine to the shaft system.

We claim:

1. Power transmission mechanism comprising an input shaft and an output shaft, a synchronous clutch engageable upon passage of the shafts through synchronism, a non-synchronous clutch engageable to establish a direct driving connection between said shafts, said non-synchronous clutch including co-acting clutch teeth which when said synchronous clutch is in a disengaged condition are capable of relative rotation, the arrangement of the clutches being such that the synchronous clutch and the non-synchronous clutch are in parallel with one another and actuation of the non-synchronous clutch to a condition in which said clutch teeth capable of relative rotation are in nuzzling engagement is prevented when the synchronous clutch is partly or wholly disengaged.

2. Power transmission mechanism according to claim 1 in a locked train gear arrangement comprising parallel power paths between said input shaft and said output shaft, said synchronous clutch and said non-synchronous clutch being arranged in parallel in one of said power paths, and said mechanism including a further non-synchronous clutch arranged in the other of said power paths, said further non-synchronous clutch including co-acting clutch teeth which when said synchronous clutch is in a disengaged condition are capable of relative rotation, said synchronous clutch and the gearing of said locked train arrangement acting in conjunction as phasing means whereby upon engagement of said synchronous clutch the coacting clutch teeth of both non-synchronous clutches are precisely phased for interengagement.

3. Power transmission mechanism according to claim 1 in a locked train gear arrangement comprising parallel power paths between said input shaft and said output shaft, said synchronous clutch and said non-synchronous clutch being arranged in parallel in one of said power paths, and said mechanism including a further non-synchronous clutch arranged in the other of said power paths, said further non-synchronous clutch including co-acting clutch teeth which when said synchronous clutch is in a disengaged condition are capable of relative rotation, said synchronous clutch and the gearing of said locked train arrangement acting in conjunction as phasing means whereby upon engagement of said synchronous clutch the coacting clutch teeth of both non-synchronous clutches are precisely phased for interengagement, said mechanism also including means for the conjoint actuation of said non-synchronous clutches.

4. Power transmission mechanism comprising an input shaft and an output shaft, a synchronous clutch engageable upon passage of said shafts through synchronism, and a non-synchronous clutch arranged in parallel with said synchronous clutch and engageable to establish a direct driving connection between said shafts, said non-synchronous clutch including first sets of co-acting clutch teeth which when said synchronous clutch is in a disengaged condition are substantially non-rotatable relative to one another and are capable of end butting contact with one another, said non-synchronous clutch also including second sets of co-acting clutch teeth which when said synchronous clutch is in a disengaged condition are capable of relative rotation, the mutual arrangement of said first and second sets of clutch teeth providing that with said synchronous clutch disengaged said non-synchronous clutch is prevented, by the end butting contact of said first sets of clutch teeth, from being actuated to a condition in which said second sets of clutch teeth are in nuzzling contact, said mechanism also including a driving connection between said synchronous clutch and said non-synchronous clutch which is effective during engaging movement of said synchronous clutch to move said first sets of clutch teeth angularly relative to one another into positions in which they are interengageable and to phase said second sets of clutch teeth for interengagement.

5. Power transmission mechanism according to claim 4 wherein said synchronous clutch is capable of over-running for both directions of relative rotation of said input and output shafts, and the mutual arrangement of said first and second sets of clutch teeth provides that for either direction of over-running of said synchronous clutch said first sets of clutch teeth are capable of end butting engagement whereby to prevent actuation of said non-synchronous clutch to a condition of nuzzling engagement of said second sets of clutch teeth.

6. Power transmission mechanism in the form of a locked train gear arrangement comprising an input shaft and an output shaft and parallel power paths between said shafts, one of said power paths including a synchronous clutch engageable to establish a direct driving connection between said shafts, the other of said power paths including a non-synchronous clutch also engageable to establish a direct driving connection between said shafts, said non-synchronous clutch including coacting clutch teeth which when said synchronous clutch is in a disengaged condition are capable of relative rotation, and means by which actuation of said non-synchronous clutch to a condition of nuzzling engagement of said clutch teeth is opposed when said synchronous clutch is in a disengaged condition, said synchronous clutch and the gearing of said locked train arrangement acting in conjunction as phasing means whereby engagement of said synchronous clutch renders said means inoperative and phases said coacting teeth for interengagement.

7. Power transmission mechanism according to claim 6 wherein said phasing means include a control sleeve capable of being shifted, when said synchronous clutch is in the engaged condition, to lock said synchronous clutch in the engaged condition by the interengagement of locking teeth, such shifting being baulked when said synchronous clutch is in a disengaged condition by end butting engagement of said locking teeth, said power transmission mechanism also including an actuating connection between said control sleeve and said non-synchronous clutch, said connection being operative to engage said non-synchronous clutch in response to actuation of said control sleeve to lock said synchronous clutch.

8. Power transmission mechanism including locked train gearing comprising at least two parallel two-part power paths, a synchronous self-shifting clutch in each of said power paths, each of said clutches being of the type comprising a toothed clutch part rotatable with one part of the associated two-part shaft, a toothed intermediate member, and means constraining said intermediate member for helical movement relative to the other part of the associated two-part shaft into and out of toothed engagement with said first clutch part, the mechanism including means mechanically interconnecting the intermediate members of said synchronous clutches whereby they move simultaneously into toothed engagement with their associated first clutch parts due to the reaction of each intermediate member upon the associated other part of the associated two-part shaft.

9. Power transmission mechanism according to claim 8 wherein one only of said synchronous clutches includes pawl and ratchet mechanism operative to initiate engagement of the said one clutch upon relative rotation in one direction of the parts of the two-part shaft in which said one synchronous clutch is included.

References Cited

UNITED STATES PATENTS 2,939,328 6/1960 Sinclair ------------- 74—339

DONLEY J. STOCKING, *Primary Examiner.*

DAVID J. WILLIAMOWSKY, *Examiner.*

H. S. LAYTON, *Assistant Examiner.*